United States Patent [19]

Swanson

[11] 4,440,228

[45] Apr. 3, 1984

[54] GELLED COMPOSITIONS AND WELL TREATING

[75] Inventor: Billy L. Swanson, Bartlesville, Okla.

[73] Assignee: Phillips Petroleum Company, Bartlesville, Okla.

[21] Appl. No.: 343,638

[22] Filed: Jan. 28, 1982

Related U.S. Application Data

[62] Division of Ser. No. 175,811, Aug. 6, 1980, Pat. No. 4,323,123, which is a division of Ser. No. 925,357, Jan. 20, 1981, Pat. No. 4,246,124.

[51] Int. Cl.$^3$ ............................................. E21B 43/22
[52] U.S. Cl. .............................. 166/274; 252/8.55 D
[58] Field of Search ................. 252/8.55 D; 166/274, 166/275

[56] References Cited

U.S. PATENT DOCUMENTS

| | | | |
|---|---|---|---|
| 3,900,406 | 8/1975 | Clampitt et al. | 252/8.55 |
| 3,909,423 | 9/1975 | Hessert et al. | 252/8.55 |
| 3,939,912 | 2/1976 | Sparlin et al. | 166/295 |
| 4,055,502 | 10/1977 | Swanson | 252/8.55 |
| 4,110,230 | 8/1978 | Hessert et al. | 252/8.55 |
| 4,323,123 | 4/1982 | Swanson | 166/302 |

FOREIGN PATENT DOCUMENTS

| | | |
|---|---|---|
| 2101182 | 3/1972 | France . |
| 2356682 | 1/1978 | France . |
| 1363871 | 8/1974 | United Kingdom . |
| 1363872 | 8/1974 | United Kingdom . |

*Primary Examiner*—Herbert B. Guynn

[57] ABSTRACT

Gelled compositions suitable as fracture fluids and water diversion agents comprising water, a polymeric viscosifier, an aldehyde component, and at least one phenolic component such as resorcinol, catechol, and the like, as well as selected oxidized phenolic materials such as 1,4-benzoquinone of natural or synthetic origin and natural and modified tannins. The gelled compositions can additionally contain gel stabilizers and chemical buffering agents.

9 Claims, No Drawings

GELLED COMPOSITIONS AND WELL TREATING

This application is a divisional of my copending application Ser. No. 175,811, filed Aug. 6, 1980, now U.S. Pat. No. 4,323,123, which is, in turn, a divisional of Ser. No. 925,357, issued Jan. 20, 1981, as U.S. Pat. No. 4,246,124.

This invention relates to gelled compositions and to hydraulic fracturing and displacing oil in subterranean formations. In accordance with one aspect, this invention relates to gelled compositions comprising a polymeric viscosifier, an aldehyde, and at least one phenolic component such as resorcinol, catechol, and the like, as well as selected oxidized phenolic materials such as 1,4-benzoquinone of natural or synthetic origin and natural as well as modified tannins. In accordance with another aspect, this invention relates to gelled compositions containing a polymeric viscosifier containing a gel stabilizer. In accordance with a further aspect, this invention relates to gelled compositions containing a polymeric viscosifier and a chemical buffering agent. In a further aspect, this invention relates to gelled compositions containing as polymeric viscosifiers a polyacrylamide or a cellulose polymer, an aldehyde, and a phenolic component with or without a gel stabilizer and chemical buffering agent. In accordance with a still further aspect, this invention relates to hydraulic fracturing and fluid displacement of oil within subterranean formations by using the above-described gelled compositions.

Fracturing porous subterranean formations penetrated by a well bore has been widely employed for increasing the production of fluids, e.g., crude oil, natural gas, etc., from said formations. The usual technique of fracturing a formation comprises introducing a fluid into the well under sufficient pressure to force the fluid out into the formation to fracture the formation and thereby alter the formation's permeability. The technique is not limited to formations of low permeability such as certain limestones, dolomite, etc., but is also applicable to other types of formations such as a sandstone containing streaks or striations of relatively high permeability and other zones of low permeability.

During the pressured injection of the gelled compositions described herein, passageways for fluid flow are created in the formation, or existing passageways therein are enlarged, thus stimulating the production of fluids from the formation. This action of the fluid pressured into the formation is called fracturing. Injection of viscous aqueous fluids into subterranean formations at a pressure or rate insufficient to create cracks or fractures in the formation is frequently used for water diversion. In such a process the injected gelled compositions reduce the permeability of thief zones which diverts the flooding fluid to the oil-rich low permeability areas so that more oil is produced. Another desirable result of this process can be a reduction in the amount of water produced (or a reduction in the water to oil ratio) which reduces pumping costs.

Hydraulic fracturing is commonly employed to increase the production of fluids from subterranean formations. Hydraulic fracturing comprises the injection of a suitable fracturing fluid such as the gelled compositions of this invention down a well penetrating a formation and into said formation under sufficient pressure to overcome the pressure exerted by the overburden. This results in creating a crack or fracture in the formation to provide a passageway which facilitates flow of fluids through the formation and into the well. Thus, it is within the scope of the present invention to inject the inventive compositions into the formation under sufficient pressure to cause fracturing or to inject the compositions into the formation at lower pressure to serve as water diversion agents.

Poor penetration of the fracturing fluid can be caused, and/or aggravated, by fluid loss to the more porous zones of the formation where low permeability is not a problem. Poor penetration can also be caused, and/or aggravated, by leak-off at the fracture faces in fracturing operations. Either said fluid loss or said leak-off can frequently worsen the situation by leaving the tight (low permeability) zones of the formation unchanged and merely opening up the already high permeability zones.

Higher fluid viscosities are advantageous in fracturing operations in that the more viscous solutions produce wider and longer fractures. More viscous solutions are also more effective in carrying propping agents into the formation when propping agents are used.

Another problem encountered in fracturing operations, particularly when employing compositions having thickening or viscosifying agents incorporated therein, is stability to heat. By stability to heat is meant the retention of the increased or greater viscosity properties under the conditions of use. Such compositions to be satisfactory should be sufficiently stable to resist degeneration by the heat of the formation for a period of time sufficient to accomplish the intended purpose, e.g., good penetration and significant fracturing of the formation. The degree of stability required in any particular operation will vary with such operating variables as the type of formation being treated, the temperature of the formation, the well depth (time to pump the gelled composition down the well and into the formation), the polymer concentration in the composition, etc.

The temperature of the formation usually has a pronounced effect on the stability of the gelled compositions and, generally speaking, is one of the most important operating variables when considering stability. Increased formation temperatures usually have at least one undesirable effect. Such an effect can be degeneration of the composition, e.g., decrease in viscosity. Thus, some compositions which would be satisfactory in a low temperature formation such as in the Hugoton field in the Anadarko basin might not be satisfactory in formations encountered in deeper wells as in some West Texas fields.

In certain fracturing operations using unthickened fluid there is usually no problem in removing the injected fluid because it is essentially water. However, a problem which is sometimes encountered when using thickened compositions in treating formations is the ease of removal of the treating composition after the operation is completed. Some thickened or highly viscous solutions are difficult to remove from the pores of the formation or the fracture after the operation is complete. Sometimes a clogging residue can be left in the pores of the formation or in the fracture. This can inhibit the production of fluids from the formation and can require costly cleanup operations. It would be desirable to have gelled compositions which break down to a lesser viscosity within a short time after the operation is completed.

The present invention provides a solution for, or at least mitigates, the above-discussed problems. The present invention provides improved methods for water diversion and fracturing operations in subterranean formations as well as new gelled compositions for use in said methods.

Accordingly, an object of this invention is to provide gelled compositions that are stable and have gelation rates that can be controlled by the choice of phenolic compounds.

Another object of this invention is to provide gelled compositions suitable for hydraulic fracturing and fluid displacement of oil within subterranean formations.

Other objects, aspects, and the several advantages of the invention will become apparent to those skilled in the art upon reading the specification and the appended claims.

In accordance with the invention, gelled compositions are provided comprising water; a water-dispersible polymer selected from cellulose ethers, polyacrylamides, biopolysaccharides, and polyalkylene oxides; one or more water-dispersible aldehydes; and one or more phenolic components such as resorcinol, catechol, and the like, as well as selected oxidized phenolic components such as 1,4-benzoquinone of natural or synthetic origin and natural and modified tannins.

Further, in accordance with the invention, there is provided a method for hydraulically fracturing a subterranean formation penetrated by at least one well which comprises injecting into the formation a gelled polymer-containing composition as defined above at a pressure sufficient to fracture the formation.

Further, in accordance with the invention, there is provided a method for displacing oil within a subterranean formation penetrated by at least one well which comprises injecting into the formation an inventive composition as defined herein at a pressure insufficient to create cracks or fractures in the formation and then following introduction of the gelled composition with a drive fluid to force oil to the surface.

In accordance with one specific embodiment of the invention, the gelled polymer composition defined above can additionally contain a gel stabilizer and/or a chemical buffering agent.

In accordance with another specific embodiment of the invention, the combination of formaldehyde and resorcinol added to a thickened aqueous solution containing a water-dispersible polymer as defined results in stable gels with temperature-dependent gelation rates. The resulting compositions are suitable as either fracturing fluids or water diversion agents in oil well treatments.

Still further, in accordance with other broad aspects of the invention, there are provided methods for preparing the gelled compositions of the invention.

In some embodiments of the invention, only one aldehyde can be used; if desired, however, a mixture of aldehydes can be used.

In some embodiments of the invention, only one phenolic compound can be used; if desired, however, a mixture of phenolic compounds can be used.

Herein and in the claims, unless otherwise specified, the term "good penetration" means penetration of the fracturing fluid into the formation a sufficient distance to result in stimulating the production of fluids therefrom, e.g., by the creation of sufficient new passageways, or sufficient enlargement of existing passageways, through said formation to significantly increase the production of fluids from the formation. This can vary for different formations, well spacings, and what it is desired to accomplish in a given fracturing treatment. Those skilled in the art will usually know what will be "good penetration" for a given formation and a given type of treatment. However, generally speaking, for guidance purposes in the practice of the invention and not by way of limitation of the invention, "good penetration" will usually be considered to be a distance of up to 500 feet or more in a large volume fracturing operation.

Herein and in the claims, unless otherwise specified, the term "polymer" is employed generically to include both homopolymers and copolymers; and the term "water-dispersible polymers" is employed generically to include those polymers which are truly water-soluble and those polymers which are dispersible in water or other aqueous medium to form stable colloidal suspensions which can be gelled as described herein. Also, the term "aqueous dispersion" is employed generically to include both true solutions and stable colloidal suspensions of the components of the compositions of the invention which can be gelled as described herein.

Any suitable polymer of acrylamide meeting the above-stated compatibility requirements can be used in the practice of the invention. Thus, under proper conditions of use, such polymers can include various polyacrylamides and related polymers which are water-dispersible and which can be used in an aqueous medium, with the gelling agents described herein, to give an aqueous gel. These can include the various substantially linear homopolymers and copolymers of acrylamide and methacrylamide. By substantially linear is meant that the polymers ar substantially free of crosslinking between the polymer chains. Said polymers can have up to about 45, preferably up to about 40, percent of the carboxamide groups hydrolyzed to carboxyl groups. Generally speaking, as the degree of hydrolysis increases, the polymers tend to become more difficult to disperse in brines, especially hard brines. Thus, one presently more preferred group of polymers includes those wherein not more than about 20 percent of the carboxamide groups are hydrolyzed. As used herein and in the claims, unless otherwise specified, the term "hydrolyzed" includes modified polymers wherein the carboxyl groups are in the acid form and also such polymers wherein the carboxyl groups are in the salt form, provided said salts are water-dispersible. Such salts include the ammonium salts, the alkali metal salts, and others which are water-dispersible. Hydrolysis can be carried out in any suitable fashion, for example, by heating an aqueous solution of the polymer with a suitable amount of sodium hydroxide.

As used herein and in the claims, unless otherwise specified, the stated values for "degree of hydrolysis" or "percent hydrolyzed," and like terms, refer to initial values prior to use or test of the polymer. Unless otherwise stated, said values were obtained by the following analytical procedure. Place 200 ml of distilled water in a beaker provided with a magnetic stirrer. Weigh a 0.1 gram polymer sample accurately to ±0.1 mg. Start the stirrer and quantitatively transfer the weighed sample into the water vortex. Stir at a rapid rate overnight. Using a pH meter and 1:1 diluted HCl, adjust the pH of the sample solution to less than 3. Stir the solution for 30 minutes. Adjust the pH of the solution to exactly 3.3 by dropwise addition of 0.1 N NaOH. Then slowly titrate with standard 0.1 NaOH from pH 3.3 to pH 7.

$$\% \text{ Hydrolysis} = \frac{V \times N \times 0.072 \times 100}{W}$$

where: V=ml of base used in titration; N=normality of base; W=grams of polymer sample; and 0.972=milliequivalent weight of acrylic acid.

Substantially linear polyacrylamides can be prepared by methods known in the art. For example, the polymerization can be carried out in aqueous medium, in the presence of a small, but effective amount of a water-soluble oxygen-containing catalyst, e.g., a thiosulfate or bisulfate of potassium or sodium or an organic hydroperoxide, at a temperature between about 30° C. and 80° C. The resulting polymer is recovered from the aqueous medium, as by drum drying, and can be subsequently ground to the desired particle size. The particle size should be fine enough to facilitate dispersion of the polymer in water. A presently preferred particle size is such that about 90 weight percent will pass through a number 10 mesh sieve, and not more than about 10 weight percent will be retained on a 200 mesh sieve (U.S. Bureau of Standards Sieve Series).

Under proper conditions of use, examples of copolymers which can be used in the practice of the invention can include the water-dispersible copolymers resulting from the polymerization of acrylamide or methacrylamide with an ethylenically unsaturated monomer copolymerizable therewith. It is desirable that sufficient acrylamide or methacrylamide be present in the monomers mixture to impart to the resulting copolymer the above-described water-dispersible properties. Any suitable ratio of monomers meeting this condition can be used. Under proper conditions of use, examples of suitable ethylenically unsaturated monomers can include acrylic acid, methacrylic acid, vinylsulfonic acid, vinylbenzylsulfonic acid, vinylbenzenesulfonic acid, vinyl acetate, acrylonitrile, methyl acrylonitrile, vinyl alkyl ether, vinyl chloride, maleic anhydride, vinyl-substituted cationic quaternary ammonium compounds, and the like. Various methods are known in the art for preparing said copolymers. For example, see U.S. Pat. Nos. 2,625,529; 2,740,522; 2,727,557; 2,831,841; and 2,909,508. Said copolymers can be used in the hydrolyzed form, as discussed above for the homopolymers.

One presently preferred group of copolymers for use in the practice of the invention are the copolymers of acrylamide or methacrylamide with a monomer of the formula

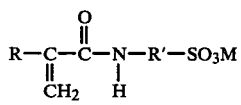

wherein R is hydrogen or a lower alkyl radical containing from 1 to 6 carbon atoms, said R preferably being hydrogen or a methyl radical; R' is an alkylene radical containing from 1 to 24 carbon atoms or an arylene radical containing from 6 to 10 carbon atoms, said R' preferably being an alkylene radical containing from 2 to about 10 carbon atoms; and M is hydrogen, ammonium, or an alkali metal, said M preferably being hydrogen, sodium, or potassium; and wherein the number of repeating units from said formula (A) monomer is within the range of from 1 to 90, preferably 3 to 40, and more preferably 5 to 20, mol percent.

Monomers of the above formula (A) and methods for their preparation are known in the art. For example, see U.S. Pat. No. 3,507,707, issued Apr. 14, 1970, and U.S. Pat. No. 3,768,565, issued Oct. 20, 1973. In the above formula (A), where R is hydrogen, R' is

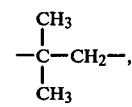

and M is hydrogen, said monomer is the well-known AMPS (trademark) monomer, 2-acrylamido-2-methylpropanesulfonic acid, which is available commercially from The Lubrizol Corporation, Cleveland, Ohio. The alkali metal salts of said monomer, e.g., sodium 2-acrylamido-2-methylpropane sulfonate, are also available.

Copolymers of acrylamide with said AMPS monomer, and/or its sodium salt, are known. For example, see the above-mentioned U.S. Pat. No. 3,768,565. A number of said copolymers are also available from Hercules Incorporated, Wilmington, Del.; for example, Hercules SPX-5024, a 90:10 acrylamide/AMPS sodium salt copolymer; Hercules SPX-5022, and 80:20 acrylamide/AMPS sodium salt copolymer; Hercules SPX-5023, a 50:50 acrylamide/AMPS sodium salt copolymer; and Hercules SPX-5025, a 30:70 acrylamide/AMPS sodium salt copolymer. The above type of copolymers wherein the number of units from said formula (A) monomer is within the range of from 5 to 20 mol percent thus comprise one presently more preferred group of copolymers for use in the practice of this invention. Said copolymers can be represented by the formula:

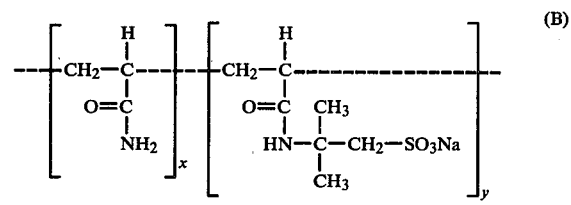

wherein x and y represent the mol percent of said units as set forth above, it being understood that the various copolymers do not necessarily consist of alternating units as depicted above in (B). It is also within the scope of the invention for the acrylamide units in the above formula (B) to be methacrylamide units and for a portion of the —NH₂ groups in said units to be hydrolyzed.

Thus, it is also within the scope of the invention for the acrylamide units in the above formula (B) to be derived from either acrylamide or methacrylamide wherein the —NH₂ group can be —NH₂ or —OM as defined below. Thus, copolymers of said derivatives with the above monomer (A) can be represented by the formula

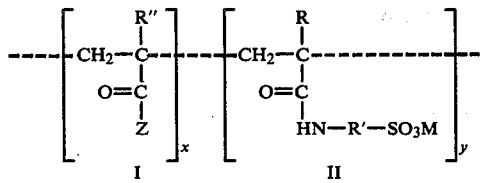

wherein R, R', and M are as defined above in formula (A); R" is hydrogen or a methyl radical; Z is either —NH$_2$ or —OM in the above Type I monomer units, with the proviso that the copolymer contains at least 10 mol percent of said Type I monomer units in which Z is —NH$_2$; and x and y are the mol percent values of the respective individual monomer units I and II, with x being in the range of from 10 to 99, preferably 60 to 97, more preferably 80 to 95, and with y being in the range of from 1 to 90, preferably 3 to 40, more preferably 5 to 20; and with it being understood that the various copolymers do not necessarily consist of alternating monomer units as depicted in formula (B'), e.g., the copolymers are random copolymers as represented by the broken lines connecting said monomer units. It is presently believed that in the above copolymers it is desirable that there be at least 10 mol percent of monomer units containing the —CONH$_2$ group in order for gelation to take place in the presence of an aldehyde gelling agent in accordance with the invention.

Another presently preferred group of copolymers for use in the practice of the invention are the copolymers of acrylamide or methacrylamide with a monomer of the formula

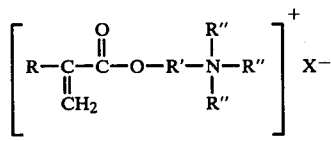

wherein R is hydrogen or a lower alkyl radical containing from 1 to 6 carbon atoms, said R preferably being hydrogen or a methyl radical; R' is an alkylene radical containing from 1 to 24 carbon atoms or an arylene radical containing from 6 to 10 carbon atoms, said R' preferably being an alkylene radical containing from 2 to about 10 carbon atoms; each R" is an alkyl radical containing from 1 to 6 carbon atoms, preferably from 1 to 4 carbon atoms; X is any suitable anion such as methylsulfate, ethylsulfate, chloride, bromide, acetate, nitrate, and the like; and wherein the number of repeating units from said formula (C) monomer is within the range of from 1 to 90, preferably 3 to 40, more preferably 5 to 20, mol percent.

Monomers of the above formula (C) and methods for their preparation are known in the art. For example, see U.S. Pat. No. 3,573,263, issued Mar. 30, 1971. In the above formula (C), when R is H, R' is —CH$_2$—CH$_2$—, one R" is a methyl radical and the other two R" are each an ethyl radical, and X is a CH$_3$SO$_4$— anion, the monomer is the commercially available material (acryloyloxyethyl)diethylmethylammonium methyl sulfate, which can be referred to as DEMMS. In the above formula (C), when R is a methyl radical, R' is —CH$_2$—CH$_2$—, each R" is a methyl radical, and X is a CH$_3$SO$_4$— anion, the monomer is the commercially available material (methacryloyloxyethyl)trimethylammonium methylsulfate, sometimes referred to as MTMMS.

Copolymers of acrylamide with said DEMMS monomer are commercially available, for example, an 80:20 acrylamide/DEMMS copolymer. Copolymers of acrylamide with said MTMMS monomer are also commercially available, for example, Hercules Reten®210, a 90:10 acrylamide/MTMMS copolymer; and Hercules Reten®220, an 80:20 acrylamide/MTMMS copolymer. The type of copolymers wherein the number of units from said formula (C) monomer is within the range of from 5 to 20 mol percent thus comprise another more preferred group of copolymers for use in the practice of the invention. Said copolymers can be presented by the formula

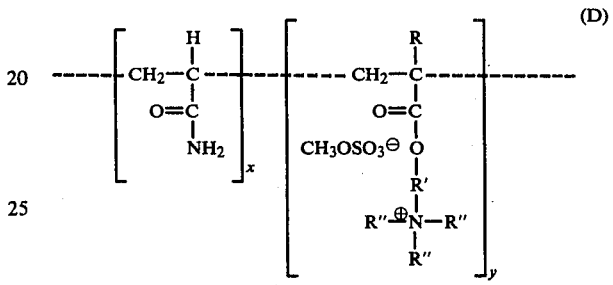

wherein R is either hydrogen or a methyl radical; each R" is a methyl radical, or one R" is a methyl radical and the other two R" are each an ethyl radical; and R' is as defined above in (C); x and y represent the mol percent of said units as set forth above, it being understood that the various copolymers do not necessarily consist of alternating units as depicted above in (D). It is also within the scope of the invention for the acrylamide units in the above formula (D) to be methacrylamide units and for a portion of the —NH$_2$ groups in said units to be hydrolyzed.

Thus, it is also within the scope of the invention for the acrylamide units in the above formula (D) to be derivatives of either acrylamide or methacrylamide wherein the —NH$_2$ groups can be —NH$_2$ or —OM as defined below. Thus, copolymers of said derivatives with the above monomer (C) can be represented by the formula

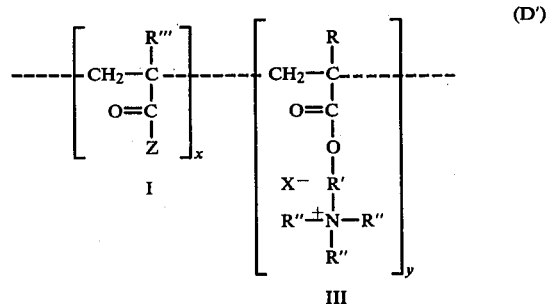

wherein R, R', R", and X are as defined above in formula (C); R''' is hydrogen or a methyl radical; in the above Type I monomer units, Z is either —NH$_2$ or —OM wherein M is hydrogen, ammonium, or an alkali metal, with said M preferably being hydrogen, sodium, or potassium, and with the proviso that the copolymer contains at least 10 mol percent of said Type I monomer units in which Z is —NH$_2$; x and y are the mol percent values of the respective individual monomer units I and III, with x being in the range of from 10 to 99, preferably 60 to 97, more preferably 80 to 95, and with y being in the range of from 1 to 90, preferably 3 to 40, more preferably 5 to 20; and with it being understood that the various copolymers do not necessarily consist of alternating monomer units as depicted in formula (D'), e.g., the copolymers are random copolymers as represented by the broken lines connecting said monomer units. It is presently believed that in the above copolymers it is desirable that there be at least 10 mol percent of monomer units containing the —CONH$_2$ group in order for gelation to take place in the presence of an aldehyde gelling agent in accordance with the invention.

Crosslinked polyacrylamides and crosslinked polymethacrylamides, including those at various stages of hydrolysis as described above, and meeting the above-stated compatibility requirements, can also be used in the practice of the invention. In general, said crosslinked polyacrylamides can be prepared by the methods described above, but including in the monomeric mixture a suitable amount of a suitable crosslinking agent. Examples of crosslinking agents can include methylenebisacrylamide, divinylbenzene, divinyl ether, and the like. Said crosslinking agents can be used in small amounts, e.g., up to about one percent by weight of the monomeric mixture. Such crosslinking which occurs when solutions of polymers and the other components of the invention are gelled as described herein.

All the polymers useful in the practice of the invention are characterized by high molecular weight. The molecular weight is not critical so long as the polymer has the above-described water-dispersible properties and meets the above-stated compatibility requirements. It is preferred that the acrylamide-derived polymers have a molecular weight of at least 500,000, more preferably at least about 2,000,000, whereas the suitable cellulose ether polymers should have a molecular weight of at least 200,000. The upper limit of molecular weight is unimportant so long as the polymer is water-dispersible and the gelled acidic composition therefrom can be pumped. Thus, it is within the scope of the invention to use polymers having molecular weights as high as 20,000,000 or higher and meeting said conditions.

The amount of the above-described polymers used in preparing the gelled acidic compositions of the invention can vary widely depending upon the particular polymer used, the purity of said polymer, and properties desired in said compositions. In general, the amount of polymer used will be a water-thickening amount, i.e., at least an amount which will significantly thicken the water to which it is added. For example, amounts in the order of 25 to 100 parts per million by weight (0.0025 to 0.01 weight percent) have been found to significantly thicken water. Distilled water containing 25 ppm of a polymer of acrylamide having a molecular weight of about $10 \times 10^6$ had a viscosity increase of about 41 percent. At 50 ppm the viscosity increase was about 106 percent. At 100 ppm the viscosity increase was about 347 percent. As another example, distilled water containing 25 ppm of a polymer of acrylamide having a molecular weight of about $3.5 \times 10^6$ had a viscosity increase of about 23 percent. At 50 ppm the viscosity increase was about 82 percent. At 100 ppm the viscosity increase was about 241 percent. Generally speaking, amounts of the above-described polymers in the range of from 0.1 to 5, preferably from 0.3 to about 2, weight percent, based on the total weight of the composition, can be used in preparing gelled acidic compositions for use in the practice of the invention.

As a further guide, when the polymer used is one of the above-discussed AMPS or AMPS salt copolymers containing 50 mol percent or more AMPS or AMPS salt units, the polymer concentration will preferably be in the range of from 0.6 to 3, more preferably 0.75 to about 2, weight percent, based on the total weight of the composition. Similarly, when the polymer used is a partially hydrolyzed polyacrylamide or polymethacrylamide, or one of the above-discussed MTMMS or DEMMS copolymers, the polymer concentration will preferably be in the range of from 0.75 to about 2 weight percent, based on the total weight of the composition. In general, with the proper amounts of phenolic compound and aldehyde, the amount of polymer used will determine the consistency of the gel obtained. Small amounts of polymer will usually produce liquid mobile gels which can be readily pumped. Large amounts of polymer will usually produce thicker, more viscous, somewhat elastic gels. Gels having a viscosity "too thick to measure" by conventional methods can still be used in the practice of the invention. Thus, there is really no fixed upper limit on the amount of polymer which can be used so long as the gelled composition can be pumped in accordance with the methods of the invention.

In general, any of the water-soluble cellulose ethers can be used to prepare the aqueous gels used in the practice of the invention. Said cellulose ethers which can be used include, among others, the various carboxyalkyl cellulose ethers, e.g., carboxyethyl cellulose and carboxymethyl cellulose (CMC); mixed ethers such as carboxyalkyl hydroxyalkyl ethers, e.g., carboxymethyl hydroxyethyl cellulose (CMHEC); hydroxyalkyl celluloses such as hydroxyethyl cellulose and hydroxypropyl cellulose; alkylhydroxyalkyl celluloses such as methylhydroxypropyl cellulose; alkyl celluloses such as methyl cellulose, ethyl cellulose, and propyl cellulose; alkylcarboxyalkyl celluloses such as ethylcarboxymethyl cellulose; alkylalkyl celluloses such as methylethyl cellulose; and hydroxyalkylalkyl celluloses such as hydroxypropylmethyl cellulose; and the like. Many of said cellulose ethers are available commercially in various grades. The carboxy-substituted cellulose ethers are available as the alkali metal salt, usually the sodium salt. However, the metal is seldom referred to, and they are commonly referred to as CMC for carboxymethyl cellulose, CMHEC for carboxymethyl hydroxyethyl cellulose, etc. For example, water-soluble CMC is commercially available in various degrees of carboxylate substitution ranging from 0.3 up to about 1.6. In general, CMC having a degree of substitution in the range of 0.65 to 0.95 is preferred. Frequently, CMC having a degree of substitution in the range of 0.85 to 0.95 is a more preferred cellulose ether. CMC having a degree of substitution less than the above-preferred ranges is usually less uniform in properties and thus less desirable for use in the practice of the invention. CMC having a degree of substitution greater than the above-preferred ranges usually has a lower viscosity and more is required in the practice of the invention. Said degree of substitution of CMC is commonly designated in practice as CMC-7, CMC-9, CMC-12, etc., where the 7, 9, and 12 refer to a degree of substitution of 0.7, 0.9, and 1.2, respectively.

Other polymers that can be used in the gels of the invention include polyalkylene oxides and biopolysaccharides, which are biochemically synthesized polysaccharides or heteropolysaccharides produced by the action of bacteria of the genus Xanthomonas upon sugar, starches, and similar carbohydrates. These polymers are well known and can be produced in accordance with known procedures. Preparation details of the biopolysaccharides can be found in U.S. Pat. No. 3,373,810, and references cited therein. The amounts of these polymers used in the instant gel compositions can be the same as for the acrylamide polymers and cellulose ethers.

Any suitable water-dispersible aldehyde meeting the above-stated compatibility requirements can be used in the practice of the invention. Thus, under proper conditions of use, both aliphatic and aromatic monoaldehydes, and also dialdehydes, can be used. The aliphatic monoaldehydes containing from one to about 10 carbon atoms per molecule are presently preferred. Representative examples of such aldehydes include formaldehyde, paraformaldehyde, acetaldehyde, propionaldehyde, butyraldehyde, isobutyraldehyde, valeraldehyde, heptaldehyde, decanal, and the like. Representative examples of dialdehydes include glyoxal, glutaraldehyde, terephthaldehyde, and the like. Various mixtures of said aldehydes can also be used in the practice of the invention. The term "water-dispersible" is employed generically herein to include both those aldehydes which are truly water-soluble and those aldehydes of limited water solubility but which are dispersible in water or other aqueous media to be effective gelling agents. Formaldehyde is the preferred aldehyde compound for use in the present invention.

Any suitable water-dispersible phenol or naphthol meeting the compatibility requirements set forth above can be used in the practice of the invention. Suitable phenols include monohydroxy and polyhydroxy naphthols. Phenolic compounds suitable for use in the present invention include phenol, catechol, resorcinol, phloroglucinol, pyrogallol, 4,4'-diphenyl, 1,3-dihydroxynaphthalene, and the like. Other phenolic components that can be used include at least one member of selected oxidized phenolic materials of natural or synthetic origin such as 1,4-benzoquinone; hydroquinone or quinhydrone; as well as a natural or modified tannin such as quebracho or sulfomethylated quebracho possessing a degree of sulfomethylation (DSM) up to about 50. (See U.S. Pat. No. 3,344,063, Col. 3, lines 15-32, which is incorporated hereby by reference). The DSM of sulfomethylated quebracho (SMQ) is sometimes indicated by writing, for example, SMQ 50 for SMQ having a DSM of 50. Resorcinol and catechol are the preferred phenolic compounds for use in the present invention for most water diversion applications. Phloroglucinol gives a very fast gelation rate and is preferred for fracture fluid applications.

Any suitable amount of aldehydes and phenolic compounds can be used in the practice of the invention. In all instances the amounts of aldehyde and phenolic compound used will be a small, but effective amount which is sufficient to cause gelation of an aqueous dispersion of the polymer, the aldehyde, and the phenolic compound. As a general guide, the amount of aldehyde used in preparing the gelled compositions of the invention will be in the range of from about 0.02 to 2, preferably 0.1 to about 0.8, weight percent, based on the total weight of the composition. The weight ratio of sulfomethylated quebracho to polymer is in the range of 0.1:1 to 5:1, preferably 0.5:1 to 2:1. The polymer concentration is in the broad range of 1,000 to 50,000 ppm, preferably 3,000 to 20,000 ppm. The concentration of phenolic material (other than SMQ) will be in the range of 0.005 to 2, preferably 0.04 to 1, weight percent.

As indicated previously, it is also within the scope of the invention to use gel stabilizers such as sulfomethylated quebracho. Quebracho is a flavotannin which is water-extracted from the bark and wood of the quebracho tree. The conventional method of preparing quebracho is to disintegrate the wood and bark followed by extraction with water. The aqueous extract is concentrated to remove about 85 percent of the water, and the residual quebracho is spray-dried. Quebracho is the commercial catechol tannin, or flavotannin product. The quebracho can be sulfomethylated as is known in the art, as is disclosed in U.S. Pat. No. 3,344,063. The amount of gel stabilizer used will vary from about 20 to about 200 weight percent, based on the weight of polymer. When used as a gel stabilizer, the sulfomethylated quebracho will have a DSM in the broad range of about 85 to 250, preferably about 100 to about 200.

It is also within the scope of the invention to use a chemical buffering agent during the gelation process. Most preferred buffering agents include water-soluble bicarbonate salts such as $NaHCO_3$, $KHCO_3$, and $LiHCO_3$. The corresponding carbonate salts are also suitable. The amount of chemical buffering agent used will vary broadly from about 0.05 to about 1, preferably about 0.1 to about 0.5, weight percent, based on the weight of the total composition.

Propping agents can be included in the gelled compositions of the invention, if desired. Propping agents which can be used include any of those known in the art, e.g., sand grains, walnut shell fragments, tempered glass beads, aluminum pellets, and similar materials, so long as they meet the above-stated compatibility requirements. Generally speaking, it is desirable to use propping agents having particle sizes in the range of 8 to 40 mesh (U.S. Sieve Series). However, particle sizes outside this range can be employed.

Any suitable method can be employed for preparing the gelled compositions of the invention. Thus, any suitable mixing technique or order of addition of the components of said composition to each other can be employed which will provide a composition having sufficient stability to degeneration by the heat of the formation (in which the composition is to be used) to permit good penetration of the composition into said formation. However, it is ordinarily preferred to first dissolve or disperse the polymer in water before contacting the polymer with the other components. The mixing order can vary with the type of polymer used. Some suitable mixing orders, with the components named in order of mixing, include: water—polymer—phenolic compound—aldehyde; water—phenolic compound—polymer—aldehyde; phenolic compound—polymer—water—aldehyde; and water—polymer—aldehyde—phenolic compound; and the like. It is within the scope of the invention to moisten or slurry the polymer with a small amount, e.g., about 1 to about 6 weight percent, based on the weight of the polymer, of a small amount of a low molecular weight alcohol, e.g., $C_1$ to $C_3$ alcohols, as a dispersion aid prior to dispersing the polymer in water.

The gelled compositions of the invention can be prepared on the surface in a suitable tank equipped with suitable mixing means, and then pumped down the well and into the formation employing conventional equipment for pumping gelled compositions. However, it is within the scope of the invention to prepare said compositions while they are being pumped down the well. This technique is sometimes referred to as "on the fly." For example, a solution of the polymer in water can be prepared in a tank adjacent the wellhead. Pumping of this solution through a conduit to the wellhead can then be started. Then, a few feet downstream from the tank a suitable connection can be provided for introducing either the phenolic compound or the aldehyde into said conduit, preferably as an aqueous solution. Then, a few feet farther downstream the other of said phenolic or aldehyde components can be similarly introduced. As will be understood by those skilled in the art, the rate of introduction of said components into said conduit will depend upon the pumping rate of the polymer solution through said conduit. Any of the above-mentioned orders of addition can be employed in said "on the fly" technique. Mixing orifices can be provided in said conduit, if desired.

It is within the scope of the invention to precede the injection of the gelled composition into the well and out into the formation with a preflush of a suitable cooling fluid, e.g., water. Such fluids serve to cool the well tubing and formation and extend the useful operating temperature range of said compositions. The volume of said cooling fluid so injected can be any suitable volume sufficient to significantly decrease the temperature of the formation being treated, and can vary depending upon the characteristics of the formation. For example, amounts up to 20,000 gallons or more can be used to obtain a temperature decrease in the order of 100° to 250° F.

The following examples will serve to further illustrate the invention, but should not be considered as unduly limiting on the invention. In carrying out the examples, the following general procedure was employed.

Polymer solutions were usually allowed to hydrate overnight before any gelling agents were added. Cellulosic polymers and Kelzan solution were stirred about an hour with a Lightnin mixer before being set aside to hydrate. Polyacrylamide solutions were stirred only a few minutes, then they were sealed in containers and rolled several hours.

For most tests, 200 ml aliquots of polymer solution were used. Gelling agents were added while the polymer solution was being stirred with a Hamilton Beach maltmixer. The order of addition was usually SMQ (as a stabilizing agent), resorcinol, formaldehyde, and sodium bicarbonate. The order of addition of reagents does not seem to be important except in iron-contaminated brines. in such brines, the best order of addition is phenolic material, polymer, sodium bicarbonate, formaldehyde, and SMQ. If iron contamination is especially severe, SMQ can be replaced with polymer on the basis of cost. All reagents were added within a few minutes.

The gel formulations were measured into the sample holder of Fann Model 50C viscometer as soon as mixing was complete. The temperature was increased from room temperature to about 325° F. in 60 minutes and held there as long as several hours. Pressure was held at 150 psi with nitrogen. The samples were sheared continuously at 30 RPM.

Static aging tests were made in 250 ml wide-mouth plastic bottles maintained at 125° F. in a water bath. Gels were evaluated simply by pouring into a beaker and making a visual judgment of gel strength. The gel strength or consistency was assigned an arbitrary value between 0 and 10. A value of 0 was given when there was no gelation or increase in viscosity, and 10 was given for a rigid gel. Some gels were shear-thickening, and gel strength increased with agitation or simply by pouring. For these gels, the initial gel strength was noted, then the gel was poured into a beaker and back three times, and a second value was assigned showing an increase of gel strength. In later work, a modified Stormer viscometer was used to measure viscosity.

Sand pack cells were made from threaded PVC pipe nipples and caps. The nipples were 2 inches ID and 4 inches long. The caps were drilled and tapped for $\frac{1}{8}$-inch pipe thread. Iron pipe nipples and caps were used later when higher aging temperatures were used. The top cap was fitted with a Hoke valve, and the bottom cap was fitted with a plug. A 60-mesh screen and a 20-mesh screen were cut to fit inside the bottom cap to hold the loose sand in place. The screens were stainless steel. All tests were made with 10–20 sand.

A layer of sand was glued to the inside of the pipe nipple to prevent the gel from channeling along the smooth surface of the pipe. The pipe surface was coated with PVC Solvent Cement, then 10–20 sand was added, and the pipe rotated until a layer of sand had adhered. The pipe was dried in an oven at 80° C. for 20 minutes. To help hold the sand in place, the sand was sprayed with Flecto Varathane liquid plastic. Finally, the pipe was dried in an oven overnight. For iron or steel pipe, Flecto Varathane liquid plastic was used for both coats. All surfaces of the steel exposed to the fluid were coated to protect from corrosion. The cells were filled completely with sand. With both caps in place, sand was poured into the vent of the top cap. However, in the earliest tests, a void was left at the top of the cell. After gels formed in the sand, strong brine was added to the void to see how the gel withstood contact with strong brine, etc., in some cases. Only Table VII contains data with sand packs not completely full of sand.

It was learned that with the cell completely full of sand the pressure could not be released at the top of cell to attach the pressure line without expansion causing a disruption in the sandpack. The use of $NaHCO_3$ in the formulations generated $CO_2$ which caused a substantial expansion on the release of pressure. For this reason, Hoke valves were used instead of plugs at the top of the cells. Pressure was applied to the valve before the valve was opened so that pressure in the cell was never released. Optionally, pressure was applied to the cells with water rather than directly in the nitrogen. A $\frac{1}{2}$-inch nipple was fitted with a reducer at each end so it could be placed in the line between the Hoke valve and the nitrogen line. The $\frac{1}{2}$-inch nipple was filled with water before the nitrogen line was attached.

To test the gel strengths, the bottom plug of the cell was removed and a threaded pipe was inserted. The cell was placed upright in a heating jacket. The jacket was heated to the temperature at which the sample was aged if it was 140° F. or less. Steel cells were aged at 190° F., but they were cooled to 140° F. before testing and tested at that temperature. The nitrogen line was attached to the top of the cell as described above. A pressure of 25 psi was applied for ten minutes. The fluid which was extruded was collected in a small beaker and measured by weighing. The pH of the fluid was measured if the volume was sufficient.

EXAMPLE I

In accordance with the general procedure, a number of gels were prepared and then tested in sand packs to demonstrate the durability of the inventive gel compositions. The results of these runs are shown in Table I.

TABLE I

Polyacrylamide Gelled with Resorcinol[a] and Formaldehyde

| Run No. | Resorcinol (lbs/1000 gal) | SMQ-150 (lbs/1000 gal) | Sand Pack Gel Stability Data[b] | | | | | |
|---|---|---|---|---|---|---|---|---|
| | | | 40 hrs. | 1 mo. | 3 mos. | 6 mos. | 9 mos. | 12 mos. |
| 1 | 8.4 | 0 | 0.10 | 0.04 | 0.06 | 0.24 | 0.70 | NM[c] |
| 2 | 8.4 | 42 | 0.64 | 0.28 | 0.21 | 0.21 | 0.22 | 0.21 |
| 3 | 12.6 | 42 | 0.42 | 0.22 | 0.21 | 0.23 | 0.08 | 0.36 |
| 4 | 17 | 42 | 0.16 | 0.08 | 0.07 | 0.49 | 0.26 | 0.28 |
| 4A | 25[d] | 42 | 0.09[d] | 0.33 | 0.96 | NR[e] | NR[e] | NR[e] |

[a]The concentrations of the components per 1,000 gallons of Burbank produced brine were 42 lbs. polyacrylamide (Reten 420, homopolymer), 17 lbs. NaHCO$_3$, and 5 gallons 37 weight percent aqueous formaldehyde. (The Reten 420 homopolymer was a product of Hercules, Inc.) See Footnote a in Table VI for preparation of synthetic Burbank brine.
[b]The recorded numbers represent the milliliters of fluid extruded per minute during a 10-minute test after aging the gels at 140° F. for the indicated time periods of 40 hours, 1 month, 3 months, 6 months, 9 months, and 12 months.
[c]NM represents "not measured" due to loss of sample by a laboratory accident.
[d]Catechol was used in this run in place of resorcinol, and the sample was aged at 190° F. instead of 140° F. The initial test was made at 48 hours instead of 40 hours. Synthetic McKean brine was used for this run. Synthetic McKean brine was made by adding 165.2 g NaCl, 113.8 g CaCl$_2$, 36.3 g MgCl$_2$.6H$_2$O, 0.105 g NaHCO$_3$, and 0.144 g Na$_2$SO$_4$ to one liter of fresh water.
[e]NR represents not recorded.

The runs in Table I indicate the low degree of fluid loss by the inventive gels under pressure in a sand pack at elevated temperature. These data indicate that the inventive gel compositions can be used as water diversion agents in operatons wherein plugging for an extended time period is desirable. The apparent advantage of incorporating SMQ (sulfomethylated quebracho) is not evident until about nine months. Compare the ml extruded under the 9-month column in Runs 1 and 2. There is no apparent overtreatment effect on increasing the resorcinol concentration from 8.4 lbs/1000 gals (Run 2) to 17 lbs/1000 gals (Run 4). In general, the SMQ-containing gels were more elastic or pituitous which is considered a desirable characteristic. Gelation rate was somewhat slower in the gel compositions containing SMQ. The catechol run is an example of a formulation that might be used when a delay in gelation is needed to pump the fluid in place in a hot reservoir.

EXAMPLE II

In iron-contaminated brines, the resorcinol component must be added before SMQ in order to produce good gels. For example, in several control runs, the order of addition was iron, SMQ-150, Reten 420, resorcinol, formaldehyde, and NaHCO$_3$. The concentration of SMQ-150 was varied from 21 lbs. to 84 lbs. per 1,000 gallons and either 56 ppm Fe$^{+2}$ or 41 ppm Fe$^{+3}$ was added. No gels formed in these control runs. In static tests these runs gave values of 0 gel strength (see footnote b in Table II). An alternate order of addition in which the resorcinol was added before the SMQ resulted in gel formaton in other runs as summarized in Table II.

TABLE II

Gelation in Iron-Contaminated Brines[a]

| Run No. | Order of Addition* | Gel Strength Rating after Aging at 125° F. (Static Test Results) | | | |
|---|---|---|---|---|---|
| | | 1 Day | 7 Days | 1 Month | 2 Months |
| 5 | A | 3 | 4 | 4 | 1 |
| 6 | B | 3 | 5 | 5 | 1 |
| 7 | C | 3 | 5 | 5 | 1 |
| 8 | D | 3 | 4 | 5.5 | 0→1 |

[a]A mixture of 51 ppm Fe$^{+3}$ as FeCl$_3$.6H$_2$O, 42 lbs Reten 420, and 8.4 lbs. resorcinol per 1000 gallons was prepared and then 42 lbs. SMQ-150, 17 lbs. NaHCO$_3$, and 5 gal. 37 wt. percent formaldehyde were added in the order indicated. These tests were made in synthetic Burbank brine.
[b]The static aging tests were made in 250 ml wide-mouth plastic bottles maintained at 125° F. in a water bath. In this method the gels were evaluated by pouring the composition into a beaker and making a visual judgment of gel strength. The gel strength or consistency was assigned an arbitrary value between 0 and 10. A value of 0 was given when there was no gelation or increase in viscosity and 10 was given for a rigid gel. Some gels were shear-thickening, and gel strength increased with agitation or simply by pouring. For such shear-thickening gels, the initial gel strength was noted, then the gel was poured into a beaker back and forth three times and a second value was assigned to show an increase in gel strength, e.g., 2.5→3. For other gels not showing a shear-thickening characteristic, a single number between 0 and 10 was recorded to indicate gel strength, e.g., 5.5.
*A represents the sequence SMQ-150, formaldehyde, and NaHCO$_3$; B represents the sequence formaldehyde, SMQ-150, and NaHCO$_3$; C represents the sequence formaldehyde, NaHCO$_3$, and SMQ-150; D represents the sequence formaldehyde, NaHCO$_3$, and no SMQ-150.

The comparable gel strengths recorded in Table II indicate that the order of addition of formaldehyde and NaHCO$_3$ with or without SMQ-150 is not critical in iron-contaminated systems as long as the resorcinol is present before the SMQ is added. Up to a period of two months aging at 125° F., the gel strengths are about the same even in the absence of SMQ. In general, the presence of iron in the system is detrimental to gel strength. As stated earlier herein, it is best that SMQ be added last in iron-contaminated brines.

EXAMPLE III

This example demonstrates the use of SMQ-150 in systems containing synthetic sea water.

TABLE III

SMQ-Containing Resorcinol-Formaldehyde Gels in Synthetic Sea Water[a]

| Run No. | (lbs/1000 gal) | Gel Strength Rating after Aging at 125° F. (Static Test Results)[b] | | | |
|---|---|---|---|---|---|
| | | 7 Days | 1 Mo. | 2 Mos. | 3 Mos. |
| 9 | 0.0 | 1.5→3.5 | 0→1.5 | NMGS# | NMGS# |
| 10 | 21 | 2.5→3 | 3.5 | 5.5 | 4 |
| 11 | 42 | 4 | 4 | 6.5 | 4 |
| 12 | 84 | 5 | 4 | 6.5 | 6 |
| 13* | 0.0 | NR[c] | 6 | 4 | 7 |

TABLE III-continued
SMQ-Containing Resorcinol-Formaldehyde Gels in Synthetic Sea Water[a]

Gel Strength Rating after Aging at 125° F. (Static

| Run No. | (lbs/1000 gal) | Test Results)[b] 7 Days | 1 Mo. | 2 Mos. | 3 Mos. |
|---|---|---|---|---|---|
| 14* | 42 | NR | 6 | 4 | 7 |

[a]Concentrations per 1,000 gal:42 lbs. Reten 420, 8.4 lbs. resorcinol, 17 lbs. NaHCO₃, and 5 gal. of 37 wt. percent formaldehyde.
[b]See Footnote b in Table II for the significance of static test numbering system.
[c]NR represents not recorded.
*Deionized water runs.
NMGS represents no measurable gel strength.

The results in Table III demonstrate the advantage of using SMQ-150 in gelling polyacrylamide with resorcinol and formaldehyde in synthetic sea water. The gel strengths in the SMQ-containing compositions (Runs 10, 11, and 12) were dramatically greater than in the control Run 9, particularly after an aging period of one month. Conversely, the deionized water runs (13 and 14) demonstrate that gel strength is independent of SMQ-150 because the gel strengths are essentially the same over the aging period in the presence or absence of SMQ-150.

EXAMPLE IV

This example demonstrates the use of various polymers in the inventive gel compositions (see Table IV).

TABLE IV
Various Polymers[a] in Herard Lease Brine with Resorcinol-Formaldehyde Gelling System

| Run No. | Polymer | Viscosity (cp) Initial | Viscosity (cp) 24 Hrs | Resorcinol g/200 ml | HCHO ml/200 ml | Viscosity (cp) 24 Hrs at 125° F. |
|---|---|---|---|---|---|---|
| 15 | SPX 5023[b] | 36 | 25 | 0.4 | 1.0 | 290 |
|  |  |  |  | 0.8 | 1.0 | 1030 |
| 16 | SPX 5025[c] | 17 | 17 | 0.4 | 1.0 | 38.5 |
|  |  |  |  | 0.8 | 1.0 | 92 |
| 17 | CMC[d] | 22 | 22 | 0.2 | 1.0 | 23 |
|  |  |  |  | 0.4 | 1.0 | 26 |
| 18 | CMHEC 66H[e] | 3 | 2.6 | 0.2 | 1.0 | 9.8 |
|  |  |  |  | 0.4 | 1.0 | 10.0 |
| 19 | CMHEC 902[f] | 34 | 36 | 0.2 | 1.0 | 44 |
|  |  |  |  | 0.4 | 1.0 | 155 |
| 20 | KELZAN XC[g] | 66 | 97 | 0.2 | 1.0 | 475 |
|  |  |  |  | 0.4 | 1.0 | 390 |
| 21 | SPX 5023 | 108 | 103 | 0.8 | 1.5 | 2100 |
|  |  |  |  | 1.2 | 3.0 | 1650 |
| 22 | SPX 5025 | 49 | 43 | 0.8 | 1.5 | 470 |
|  |  |  |  | 1.2 | 3.0 | 540 |
| 23 | CMC | 127 | 120 | 0.4 | 1.0 | 120 |
| — | — | — | — | 0.8 | 1.0 | 118 |
| Q | CMC | 1020 | — | 1.6 | 4.0 | 1900 |

[a]Polymer concentration was 5,000 ppm in the first six runs of Table IV. Runs 21, 22, and 23 have a polymer concentration of 10,000 ppm.
[b]SPX 5023 as identified hereinabove.
[c]SPX 5025 as indentified hereinabove.
[d]CMC as identified hereinabove.
[e,f]CMHEC as discussed hereinabove.
[g]KELZAN XC is a commercially available biopolysaccharide viscosifier.
NaHCO₃ was added at 0.4 g per 200 ml. SMQ was added at 1.0 g per 200 ml. Viscosity tests were made with a modified Stormer viscometer.
Herard lease brine contains 68,000 ppm chlorides, 5,500 ppm calcium, and 7,000 ppm total hardness.
Run Q was made in fresh water with 15,000 ppm polymer.

The results of Table IV indicate that the inventive process can be used to gel a variety of polymers and copolymers such as SPX 5023 and SPX 5025 which are copolymers of acrylamide and 2-acrylamido-2-methylpropanesulfonic acid described hereinabove; cellulose ethers such as carboxymethylcellulose and carboxymethylhydroxyethyl cellulose; and biopolysaccharides prepared by employing bacteria of the genus Xanthomonas as described in U.S. Pat. No. 3,532,166. It should be pointed out that CMC is much less effective in hard brine and could be used only in weak brine or fresh water.

EXAMPLE V

This example demonstrates the use of the resorcinol-formaldehyde gelling system in hard brines. The results are given in Table V.

TABLE V
Resorcinol or Catechol Gels in Hard Brines[a]

| Run No. | Phenolic Compound (lbs/1000 gal) | NaHCO₃ (lbs/1000 gal) | Polymer | Gel Strength Rating after Static Aging at 125° F.[b] 1 Day | 14 Days | 1 Month | 2 Months |
|---|---|---|---|---|---|---|---|
|  | Resorcinol: |  |  |  |  |  |  |
| 24 | 4.2 | 17 | SPX 5024[d] | 3 | = | 7 | 5.5 |
| 25 | 17 | 34 | SPX 5024[d] | 9 | 9 | 9 | 8[e] |
| 26 | 17 | 34 | Reten 210[c] | 8.5 | 8.5 | 6 | 3.5[e] |
|  | Catechol: |  |  |  |  |  |  |
| 27 | 25 | 17 | SPX 5024[d] | 4 | NMGS# | e |  |

TABLE V-continued

Resorcinol or Catechol Gels in Hard Brines[a]

| Run No. | Phenolic Compound (lbs/1000 gal) | NaHCO3 (lbs/1000 gal) | Polymer | Gel Strength Rating after Static Aging at 125° F.[b] | | | |
|---|---|---|---|---|---|---|---|
| | | | | 1 Day | 14 Days | 1 Month | 2 Months |
| 28 | 17 | 17 | SPX 5024[d] | 0* | NMGS# | e | |

*This system remained at room temperature after initial testing. A gel formed on the following day. Later work showed that more time or more heat is necessary for this formulation to gel well.
NMGS represents No Measurable Gel Strength.
[a]Samples contained 42 lbs. polymer and 42 lbs. SMQ-150, and 5 gal 37 weight percent aqueous formaldehyde per 1,000 gallon, using Montana brine with a total hardness of 46,400 ppm.
[b]See Footnote b in Table II for significance of the numbers recorded in static aging tests.
[c]Reten 210 is a 90:10 acrylamide/MTMMS copolymer; the MTMMS is described hereinabove (methacryloyloxyethyl) trimethylammonium methylsulfate (a so-called cationic polymer).
[d]SPX 5024 is described hereinabove as a copolymer of acrylamide and 2-acrylamido-2-methylpropanesulfonic acid.
[e]Signs of instability were noted in these samples.

The above results suggest that resorcinol systems have a faster gelling rate and yield more stable gels than catechol systems in hard brine.

EXAMPLE VI

The following example demonstrates the use of the present inventive gelling system with carboxymethylhydroxyethyl cellulose. The results are shown in Table VI.

TABLE VI

Gelation of Carboxymethylhydroxyethyl Cellulose[a] with Resorcinol and Formaldehyde

| Run No. | (lbs/1000 gal) | | Gel Strength Rating after Static Aging at 125° F.[b] | |
|---|---|---|---|---|
| | SMQ-150 | Resorcinol | 16 Hrs. | 14 Days |
| 29 | 0.0 | 4.2 | 5 | 1.5 |
| 30 | 42 | 4.2 | 8 | 7 |
| 31 | 0.0 | 8.4 | 7 | Broken |
| 32 | 42 | 8.4 | 8 | 8 |

[a]CMHEC 420* (420 = a carboxymethyl D.S. of 0.4 and a hydroxyethyl M.S. of 2.0) was used in a concentration of 42 lbs/1000 gal; NaHCO3 at 17 lbs/1000 gal in produced Burbank brine. (Synthetic Burbank brine was prepared by dissolving 66.6 g NaCl, 15.3 g CaCl2, 5.1 g MgCl2.6H2O, and 1.55 g BaCl2.2H2O in one liter of deionized water.) The composition contained 5 gallons 37 wt. percent aqueous formaldehyde per 1,000 gallons.
[b]See Footnote b in Table II.
*CMHEC 420 is the designation used for carboxymethylhydroxyethyl cellulose possessing a carboxymethyl degree of substitution (D.S.) equal to 0.4 and a hydroxyethyl molar substitution (M.S.) equal to 2.0.

The results in Table VI illustrate that good gels can be prepared with CMHEC 420 (carboxymethylhydroxyethyl cellulose) in synthetic Burbank brine. Runs 30 and 32 demonstrate the advantage of using SMQ-150.

EXAMPLE VII

This example demonstrates the gelling of carboxymethylhydroxyethyl cellulose (CMHEC 420) with resorcinol and formaldehyde in a weak brine. The results are shown in Table VII.

TABLE VII

Gelled Carboxymethylhydroxyethyl Cellulose Compositions[a]

| Run No. | (lbs./1000 gal) | | Sand Pack Gel Stability Data[b] | | | |
|---|---|---|---|---|---|---|
| | SMQ-150 | Resorcinol | 40 Hrs. | 1 Mo. | 2 Mos. | 3 Mos. |
| 33[c,d] | 0.0 | 2.5 | 1.6 | 0.08 | 0.17 | 0.06 |
| 34[c,d] | 0.0 | 3.4 | 0 | 0.10 | 0.07 | 0.12 |
| 35[c,e] | 21 | 4.2 | 0.08 | 0.04 | 0.13 | 1.4 |
| 36[c,e] | 42 | 4.2 | 0 | 0 | 0.06 | 0.07 |
| 37[c,e] | 63 | 4.2 | 0.06 | 0.03 | 0 | 0 |

[a]CMHEC 420 was used in a concentration of 42 lbs/1000 gal.; NaHCO3 at 17 lbs/gal.; with 3 gal. 37 wt. percent aqueous formaldehyde per 1000 gal.
[b]See Footnote b in Table I.
[c]A weak brine was used which was prepared by dissolving 0.910 g NaCl, 0.239 g CaCl2, and 0.109 g MgCl2.2H2O in one liter of deionized water.
[d]Sand was prewashed with fresh water.
[e]Sand was prewashed with Great Bend brine (total hardness 3320 ppm).

The data in Table VII show that stable gels with CMHEC 420 can be prepared in weak brine by using the inventive gelling system. The extended aging results show the advantage of including SMQ-150 in the compositions (see particularly Runs 36 and 37).

The results in Table VIII show that the CMHEC 420 gels were considerably less stable in the higher synthetic Burbank brine.

TABLE VIII

CHMEC 420 Gels in Synthetic Burbank Brine[a]

| Run No. | Resorcinol (lbs./1000 gal) | HCHO (lbs./1000 gal) | Sand Pack Gel Stability Data[b] | |
|---|---|---|---|---|
| | | | 40 Hours | One Month |
| 38 | 4.2 | 2.5 | 0.14 | 2.8 |
| 39 | 4.2 | 3.75 | 0.0 | 5.9 |
| 40 | 4.2 | 5 | 0.06 | 1.8 |

[a]For composition of synthetic Burbank brine, see Footnote a in Table VI. These compositions contained 42 lbs. CMHEC 420 and 17 lbs. NaHCO3 per 1000 gal.
[b]See Footnote b in Table I.

EXAMPLE VIII

This example illustrates the operability of 1,4-benzoquinone in the inventive process. Tests were made with a Fann Model 50 C viscometer rotating constantly at 30 RPM. The oil bath of the viscometer was heated to 325° F. in approximately one hour and maintained at 325° F. throughout the test. The fresh water gel formulation contained 10,000 ppm polyacrylamide (Reten 420), 2,000 ppm sodium bicarbonate, 2,000 ppm formaldehyde (1 ml of 37 weight percent aqueous formaldehyde/200 ml sample), and 1,000 ppm 1,4-benzoquinone. The following tabulation (Table IX) shows the viscosity of the system as a function of time. In this run gelation started after 60 minutes of heating at a temperature of about 295° F.

TABLE IX

Gel Formulation Containing 1,4-Benzoquinone

| Time (Hrs.) | Viscosity* (cp) |
|---|---|
| 0.5 | 45 |
| 1.0 | 30 |
| 1.5 | 90 |
| 2.0 | 230 |
| 2.5 | 340 |
| 3.0 | 420 |
| 3.5 | 490 |
| 4.0 | 540 |
| 4.5 | 570 |

*The viscosity of the 1,4-benzoquinone gel leveled off at 600 cp for the last two hours in a 7.5-hour run at 325° F.

EXAMPLE IX

This example illustrates the operability of hydroquinone in the inventive process. Gel formulation and test procedures were essentially the same as described in Example VIII. The runs (41–43) in Table X involving the use of resorcinol, catechol, and phenol are included for comparison.

TABLE X

Gel Formation Containing Hydroquinone

| Run No. | Phenolic Component* | Viscosity (cp)/Time (hours) | | | | | | | |
|---|---|---|---|---|---|---|---|---|---|
| 41[a] | Resorcinol | 50/0.5 | 950/1.0 | 2000+/1.5 | 1700/2.0 | 1270/2.5 | NM[b] | NM[b] | NM[b] | NM[b] |
| 42[c] | Catechol | 40/0.5 | 35/1.0 | 1340/1.5 | 1750/2.0 | 1880/2.5 | 1880/3.0 | 1870/3.5 | 1980/4.0 | 2000/4.5 |
| 43[c] | Phenol | 50/0.5 | 35/1.0 | 260/1.5 | 1000/2.0 | 1000/2.5 | 1000/3.0 | 1000/3.5 | 960/4.0 | 900/4.5 |
| 44[c] | Hydroquinone | 40/0.5 | 25/1.0 | 100/1.5 | 310/2.0 | 770/2.5 | 1100/3.0 | 1220/3.5 | 1250/4.0 | 1350/4.5 |

*Approximately 1,000 ppm phenolic component was used in Runs 41, 42, and 44 whereas 2,000 ppm phenolic component was used in Run 43 since phenol contains only one hydroxyl group per molecule.
[a]Gelation started after 42 minutes of heating (ca. 205° F.).
[b]NM represents not measured.
[c]Gelation started after 55 minutes of heating (ca. 275° F.).

The results in Table X illustrate that the hydroquinone system gave a slower gelling rate but the gel appeared more stable at temperatures in the 325° F. range than similar gels containing resorcinol and phenol. The catechol system was likewise slower in gelling but displayed somewhat higher viscosity up to 4.5 hours than did even the hydroquinone system.

EXAMPLE X

This example illustrates the operability of sulfomethylated quebracho (DSM=10) and quebracho as gelling agents in the inventive process. Gel formulations and test procedures were essentially the same as described in Example VIII. The results are shown in Table XI. Attention is called to a slightly different procedure for quebracho: quebracho was dispersed in hot tap water, then the polyacrylamide (Reten 420) was added and allowed to hydrate before the other components were added.

TABLE XI

Gel Formulations with SMQ (10, 85, and 150) and Quebracho

| Run No. | Phenolic Component | Viscosity (cp)/Time (hours) | | | | | | | |
|---|---|---|---|---|---|---|---|---|---|
| 45 | SMQ (DSM = 10) | 30/0.5 | 30/1.0 | 110/1.5 | 170/2.0 | 240/2.5 | 330/3.0 | 440/3.5 | 550/4.0 | 650/4.5 |
| 46 | SMQ (DSM = 85) | 45/0.5 | 35/1.0 | 85/1.5 | 105/2.0 | 120/2.5 | 120/3.0 | 120/3.5 | 120/4.0 | 120/4.5 |
| 47 | SMQ (DSM = 150) | 55/0.5 | 45/1.0 | 80/1.5 | 100/2.0 | 105/2.5 | 107/3.0 | NM[a] | NM | NM |
| 48 | Quebracho | 60/0.5 | 800/1.0 | 3300/1.5 | 4250/2.0 | 4300/2.5 | NM | NM | NM | NM |

[a]NM represents not measured.

The results in Table XI illustrate that the quebracho system is the most preferred. Of the sulfomethylated quebracho systems, the system disclosed in Run 45 (DSM=10) is considered operable. The results in Runs 46 and 47 (DSM=85 and 150, respectively) are considered inoperable since a control system in the absence of SMQ gave a viscosity of 150 cp after three hours at 325° F.

I claim:

1. A process for displacing oil within a subterranean formation penetrated by at least one well which comprises:

injecting into the formation a gel forming composition comprising (a) water, (b) a water-thickening amount of a water-dispersible polymer selected from the group consisting of cellulose ethers, polyacrylamides and biopolysaccharides or heteropolysaccharides produced by the action of bacteria of the genus Xanthomonas upon carbohydrates, (c) a small, but effective amount in the range of 0.02 to 2 weight percent of at least one aldehyde component selected from the group consisting of aliphatic monoaldehydes having from 1 to about 10 carbon atoms per molecule, glyoxal, glutaraldehyde, and terephthaldehyde, and (d) a small, but effective amount in the range of 0.005 to 2 weight percent of at least one phenolic compound selected from the group consisting of phenol, catechol, resorcinol, phloroglucinol, pyrogallol, 4,4'-diphenol, 1,3-dihydroxynaphthalene, 1,4-benzoquinone, hydroquinone, quinhydrone, and quebracho which amounts of aldehyde (c) and phenolic compound (d) are sufficient to cause gelation of an aqueous dispersion of polymer (b) and form said gelled composition, at a pressure or rate insufficient to create cracks or fractures in the formation but sufficient to force said composition into the more permeable portions of the formation to reduce the permeability of same and introducing into the formation a drive fluid at a pressure and rate sufficient to force oil from the less permeable oil-rich zones to the surface, thereby increasing oil production and/or reducing the water/oil ratio of the production well.

2. A process according to claim 1 wherein said drive fluid comprises water.

3. A process according to claim 1 wherein said drive fluid comprises natural water.

4. A process according to claim 1 wherein the amount of (b) is in the range of 0.1 to 5 weight percent, the amount of (c) is in the range of 0.1 to 0.8 weight percent, and the amount of (d) is in the range of 0.04 to 1 weight percent.

5. A process according to claim 1 wherein there is additionally present
    (e) a gel stabilizer comprising sulfomethylated quebracho having a DSM ranging from about 85 to 250 in an amount ranging from about 20 to about 200 weight percent based upon the weight of polymer (b) and
    (f) a chemical buffering agent comprising water-soluble carbonate and bicarbonate salts in an amount ranging from 0.05 to 1 weight percent based on the weight of total composition.

6. A process according to claim 5 wherein (e) is sulfomethylated quebracho having a DSM ranging from about 85 to 250 and (f) is sodium bicarbonate.

7. A process according to claim 1 wherein (b) is a cellulose ether or a partially hydrolyzed polyacrylamide wherein not more than about 45 percent of the carboxamide groups are initially hydrolyzed to carboxyl groups and the amount thereof is within the range of from 0.1 to about 5 weight percent, based on the total weight of said composition; (c) is formaldehyde, and (d) is resorcinol or catechol.

8. A process according to claim 7 wherein said composition additionally contains (e) sulfomethylated quebracho having a DSM ranging from about 85 to about 250 and (f) sodium bicarbonate.

9. A process for displacing oil within a subterranean formation penetrated by at least one well which comprises injecting into the formation a gel forming composition comprising
    (a) water,
    (b) a water-thickening amount of a water-dispersible polymer selected from the group consisting of cellulose ethers, polyacrylamides, and biopolysaccharides or heteropolysaccharides produced by the action of bacteria of the genus Xanthomonas upon carbohydrates,
    (c) a small, but effective amount in the range of 0.02 to 2 weight percent, of at least one aldehyde component selected from the group consisting of aliphatic monoaldehydes having from one to about 10 carbon atoms per molecule, glyoxal, glutaraldehyde, and terephthaldehyde, and
    (d) a small, but effective amount of sulfomethylated quebracho possessing a degree of sulfomethylation (DSM) up to about 50 wherein the weight ratio of sulfomethylated quebracho to polymer (b) is in the range of 0.1:1 to 5:1, which amounts of aldehyde (c) and (d) are sufficient to cause gelation of an aqueous dispersion of polymer (b) and form said gelled composition.

* * * * *